(12) United States Patent
Domon et al.

(10) Patent No.: US 10,407,781 B2
(45) Date of Patent: Sep. 10, 2019

(54) ELECTROLYSIS APPARATUS AND ELECTROLYSIS METHOD

(71) Applicant: DE NORA PERMELEC LTD, Fujisawa-shi, Kanagawa (JP)

(72) Inventors: Hiroki Domon, Tamano (JP); Akiyoshi Manabe, Fujisawa (JP); Masahiro Ohara, Tamano (JP)

(73) Assignee: DE NORA PERMELEC LTD, Fujisawa-shi, Kanagawa (JP)

( * ) Notice: Subject to any disclaimer, the term of this patent is extended or adjusted under 35 U.S.C. 154(b) by 133 days.

(21) Appl. No.: 15/743,887

(22) PCT Filed: Aug. 17, 2016

(86) PCT No.: PCT/JP2016/074043
§ 371 (c)(1),
(2) Date: Jan. 11, 2018

(87) PCT Pub. No.: WO2017/030153
PCT Pub. Date: Feb. 23, 2017

(65) Prior Publication Data
US 2018/0195183 A1  Jul. 12, 2018

(30) Foreign Application Priority Data

Aug. 20, 2015 (JP) .................. 2015-163039

(51) Int. Cl.
*C25B 1/10* (2006.01)
*C25B 1/26* (2006.01)
(Continued)

(52) U.S. Cl.
CPC .................. *C25B 1/10* (2013.01); *C25B 1/12* (2013.01); *C25B 1/26* (2013.01); *C25B 9/00* (2013.01);
(Continued)

(58) Field of Classification Search
CPC .. C25B 15/08; C25B 1/10; C25B 1/12; C25B 1/26
See application file for complete search history.

(56) References Cited

U.S. PATENT DOCUMENTS

2010/0264038 A1  10/2010  Duret

FOREIGN PATENT DOCUMENTS

CN  203807564       9/2014
JP  08311676 A  *  11/1996
(Continued)

OTHER PUBLICATIONS

International Search Report, issued in the corresponding PCT application No. PCT/JP2016/074043, dated Sep. 20, 2016, 4 pages.
(Continued)

*Primary Examiner* — Nicholas A Smith
(74) *Attorney, Agent, or Firm* — Hamre, Schumann, Mueller & Larson, P.C.

(57) ABSTRACT

To provide an electrolytic apparatus and an electrolytic method which can remove a risk of reaching an explosion limit of hydrogen by gradual accumulation of a very small amount of gas in a circulation line of an electrolytic solution in an electrolytic process generating hydrogen. The electrolytic apparatus 1 is characterized by including an anode gas feeding line 20 connecting a gas phase region 21 to an anode side gas-liquid separation means in order to dilute the concentration of the hydrogen gas by feeding anode gas into the gas phase region 21 in which hydrogen gas can exist as a gas phase. By feeding at least a part of the anode gas to the gas phase region 21 with the anode gas feeding line 20, the hydrogen gas in the gas phase region 21 is diluted with the anode gas so that the concentration of the hydrogen gas is surely less than a lower limit value of explosion limit.

16 Claims, 3 Drawing Sheets

(51) Int. Cl.
  *C25B 1/12* (2006.01)
  *C25B 15/00* (2006.01)
  *C25B 15/08* (2006.01)
  *C25B 9/00* (2006.01)
  *C25B 9/10* (2006.01)
  *C25B 15/02* (2006.01)

(52) U.S. Cl.
  CPC ............... *C25B 9/10* (2013.01); *C25B 15/00* (2013.01); *C25B 15/02* (2013.01); *C25B 15/08* (2013.01); *Y02E 60/366* (2013.01)

(56) References Cited

FOREIGN PATENT DOCUMENTS

| | | |
|---|---|---|
| JP | 2003-096587 | 4/2003 |
| JP | 2009-228044 | 10/2009 |
| JP | 2015-029921 | 2/2015 |
| WO | 2015014716 | 2/2015 |

OTHER PUBLICATIONS

Japanese Office Action, issued in the corresponding Japanese patent application 2015-163039, dated Jul. 2, 2019, 6 pages (including translation), citing JP 2015-29921 and JP 2009-228044 previously filed in the IDS on Jan. 11, 2018.

Extended European Search Report, issued in the corresponding European patent application 16837142.5, dated Feb. 20, 2019, 9 pages.

Chinese Office Action, issued in the corresponding Chinese patent application 201680047176.X, dated Feb. 3, 2019, 8 pages.

\* cited by examiner

[Fig. 1]
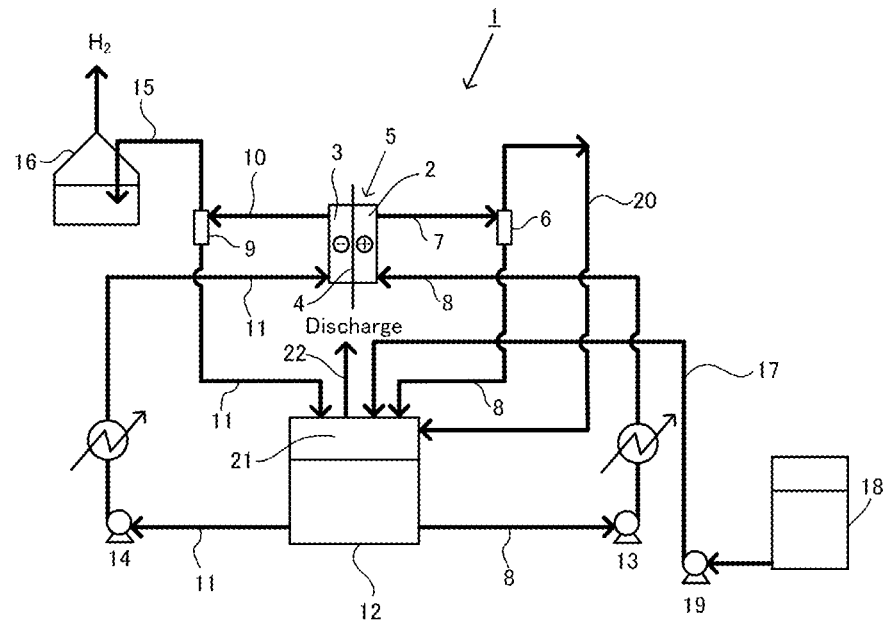
[Fig. 2]
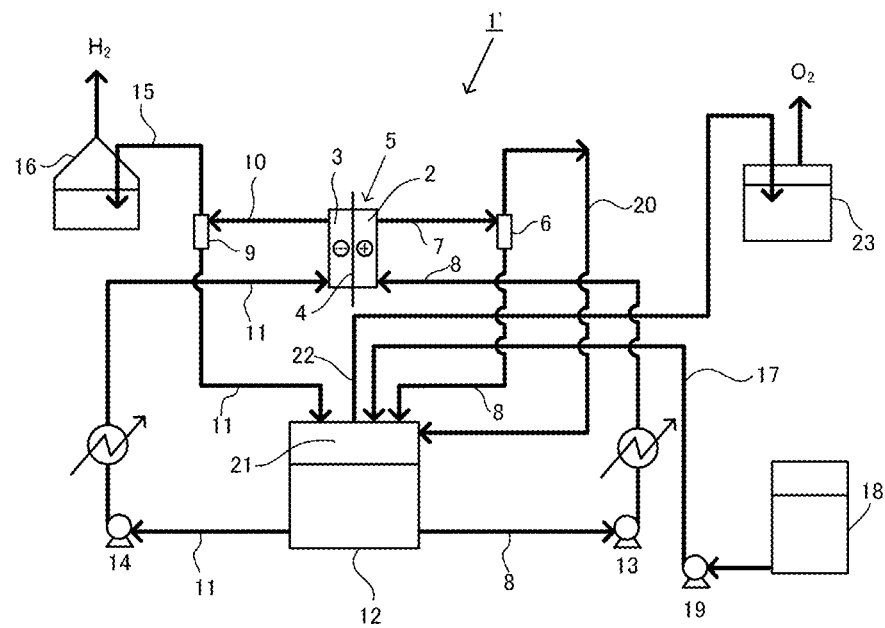

[Fig. 3]
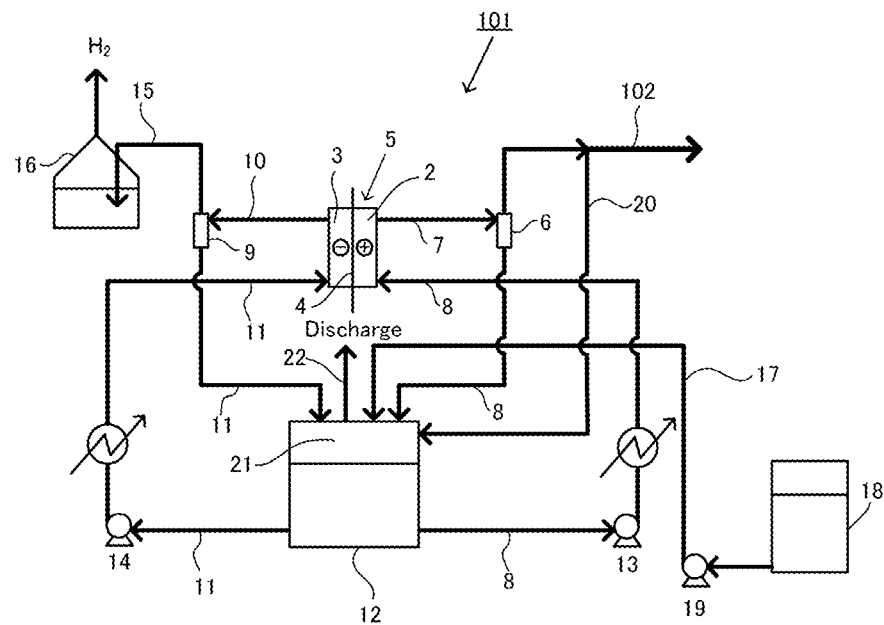
[Fig. 4]
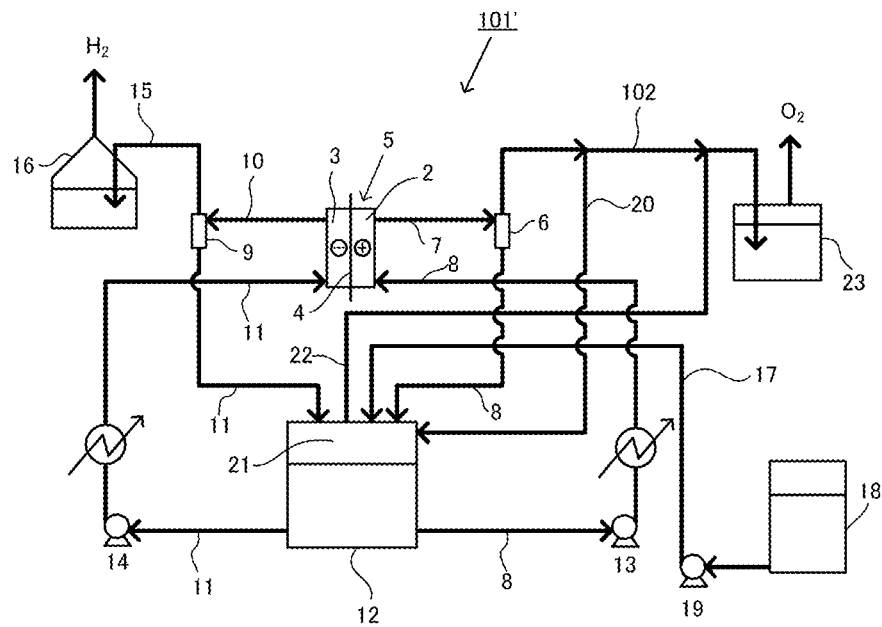

[Fig. 5]
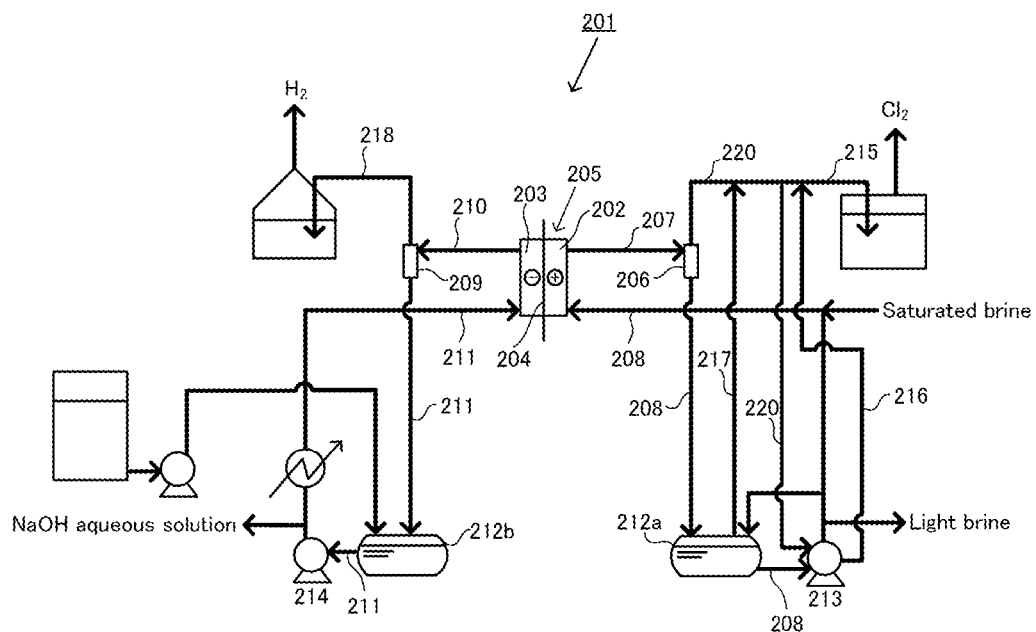

ELECTROLYSIS APPARATUS AND ELECTROLYSIS METHOD

TECHNICAL FIELD

The present invention relates to an electrolytic apparatus and an electrolytic method in which hydrogen gas is generated by electrolysis, particularly to an alkaline water electrolytic apparatus and an electrolytic method using the apparatus.

BACKGROUND

In alkaline water electrolysis, electrolysis of pure water, electrolysis of non-purified water, brine electrolysis, electrolysis of a chloride aqueous solution, a bromide aqueous solution, a hydrochloric acid aqueous solution, or a sulfuric acid aqueous solution, or the like, hydrogen gas is generated by electrolysis.

An example of an electrolytic apparatus and an electrolytic method in which hydrogen gas is generated is an alkaline water electrolytic apparatus and an alkaline water electrolytic method described in Patent Literature 1. In the electrolytic apparatus and electrolytic method of Patent Literature 1, an anode liquid and a cathode liquid made of a gas-liquid mixed fluid and generated in an anode chamber and a cathode chamber are collected in a common circulation tank to be mixed in the circulation tank. Thereafter, the mixed liquid is circulated and supplied into both electrolytic chambers of the anode chamber and the cathode chamber. The electrolysis is continuously performed while the concentrations of the electrolytic solutions supplied into both the electrolytic chambers are made the same and are maintained at a constant concentration all the time by mixing the anode liquid and the cathode liquid in the circulation tank.

CITATION LIST

Patent Literature

Patent Literature 1: JP 2015-029921 A

SUMMARY OF INVENTION

Technical Problem

In an electrolytic apparatus and an electrolytic method in which hydrogen gas is generated, hydrogen gas is mixed with oxygen gas, chlorine gas, bromine gas, or the like in some cases.

For example, in the above-described alkaline water electrolytic apparatus and process, the anode liquid and the cathode liquid generated in the anode chamber and the cathode chamber are conveyed to a the circulation tank after being subjected to gas-liquid separation. Oxygen gas and hydrogen gas are dissolved in the anode liquid and the cathode liquid after the gas-liquid separation. The amount of gas dissolved in the electrolytic solution changes according to a partial pressure of hydrogen in the gas phase or the temperature. When the amount of gas dissolved in the electrolytic solution exceeds a saturation dissolution amount, the dissolved gas exists as gas in a circulation line of the electrolytic solution, such as an upper part of the circulation tank. The amount of the vaporized hydrogen gas is originally very small. However, hydrogen gas is accumulated gradually in a closed space such as the upper part of the circulation tank or an inverse-U shaped pipe. It cannot be said that there is no possibility of reaching an explosion limit of hydrogen.

When a gas phase region in which hydrogen gas is accumulated is formed in this way, a risk of the hydrogen explosion may be surely prevented by diluting and reducing a hydrogen concentration in the gas phase region by continuously supplying inert gas such as nitrogen gas, the air, or the like to the gas phase region.

However, when inert gas is used, operation cost is increased because of cost of the inert gas. When the air is used, $CO_2$ existing in the air becomes a problem. In the alkaline water electrolysis, $CO_2$ in the air and a cation ($Na^+$, $K^+$ or the like) in the electrolytic solution are reacted to each other to generate a carbonate. The carbonate precipitates in the pipe or the like after a long-term operation. Therefore, the pipe is blocked, and the electrolytic process may be unable to be continued.

An object of the present invention is to provide an electrolytic apparatus and an electrolytic method which can remove a possibility of reaching an explosion limit of hydrogen by gradual accumulation of a very small amount of gas in a circulation line of an electrolytic solution in the above-described electrolytic process generating hydrogen.

Solution to Problem

In order to achieve the above-described object, a first aspect of the present invention is characterized by an electrolytic apparatus including an anode chamber that houses an anode and generates anode gas;

a cathode chamber that houses a cathode and generates hydrogen gas;

a diaphragm that separates the anode chamber and the cathode chamber from each other; and an anode side circulation line that discharges an electrolytic solution from the anode chamber and returns the electrolytic solution to the anode chamber, wherein the anode side circulation line includes: an anode side gas-liquid separation unit that separates the anode gas from the electrolytic solution; an anode side discharge line that connects the anode chamber to the anode side gas-liquid separation unit, discharges the electrolytic solution and the anode gas from the anode chamber, and feeds the electrolytic solution and the anode gas to the anode side gas-liquid separation unit; and an anode side supplying line that connects the anode chamber to the anode side gas-liquid separation unit, discharges the electrolytic solution from the anode side gas-liquid separation unit, and feeds the electrolytic solution to the anode chamber, the electrolytic apparatus further comprises an anode gas feeding line that connects the anode side gas-liquid separation unit to a gas phase region in which the anode gas is mixed with hydrogen gas derived from the dissolved hydrogen gas and existing as a gas phase, the anode gas feeding line feeding at least a part of the anode gas to the gas phase region, and the concentration of the hydrogen gas in the gas phase region is less than a lower limit value of explosion limit.

More specifically, the first aspect of the present invention is characterized by the electrolytic apparatus including an electrolytic apparatus in the related art provided with the anode gas feeding line which connects the anode side gas-liquid separation unit to the gas phase region in order to reduce the concentration of hydrogen gas in the gas phase region by feeding at least a part of the anode gas to the gas phase region in which the hydrogen gas derived from the dissolved hydrogen gas can exist as a gas phase and diluting the hydrogen gas with the anode gas.

In the first aspect, the concentration of the hydrogen gas in the gas phase region is less than 4% by volume.

In the first aspect, in water electrolysis, the anode gas is oxygen gas.

In the first aspect, the electrolytic apparatus may further include a cathode side circulation line including: a cathode side gas-liquid separation unit that separates the hydrogen gas from the electrolytic solution; a cathode side discharge line that connects the cathode chamber to the cathode side gas-liquid separation unit, discharges the electrolytic solution and the hydrogen gas from the cathode chamber, and feeds the electrolytic solution and the hydrogen gas to the cathode side gas-liquid separation unit; and a cathode side supplying line that connects the cathode chamber to the cathode side gas-liquid separation unit, discharges the electrolytic solution containing dissolved hydrogen gas from the cathode side gas-liquid separation unit, and feeds the electrolytic solution to the cathode chamber; and a circulation tank that is disposed in the middle of the anode side supplying line and the cathode side supplying line, and mixes the electrolytic solution fed from the anode side supplying line with the electrolytic solution fed from the cathode side supplying line, wherein the gas phase region is formed in the mixing circulation tank, and the anode gas feeding line is connected to the gas phase region of the circulation tank.

In this case, the anode gas feeding line is preferably connected to the gas phase region formed in an upper part in the circulation tank.

In the first aspect, the electrolytic solution may be an alkaline aqueous solution.

In the first aspect, the electrolytic solution may be pure water or non-purified water.

In the first aspect, the electrolytic solution on the anode side may be a chloride aqueous solution, and the electrolytic solution on the cathode side may be an alkaline aqueous solution.

The second aspect of the present invention is characterized by an electrolytic method electrolyzing an electrolytic solution using an electrolytic apparatus including an anode chamber that houses an anode and generates anode gas; a cathode chamber that houses a cathode and generates hydrogen gas; a diaphragm that separates the anode chamber and the cathode chamber from each other; and an anode side circulation line that discharges the electrolytic solution from the anode chamber and returns the electrolytic solution to the anode chamber, the method comprising: discharging the electrolytic solution and the anode gas from the anode chamber, separating the anode gas from the electrolytic solution, and returning the electrolytic solution from which the anode gas has been separated to the anode chamber; and feeding at least apart of the separated anode gas to a gas phase region in which the anode gas is mixed with hydrogen gas derived from the dissolved hydrogen gas and existing as a gas phase, and diluting the hydrogen gas in the gas phase region with the fed anode gas so that concentration of the hydrogen gas in the gas phase region is less than a lower limit value of explosion limit.

In the second aspect, the hydrogen gas in the gas phase region is diluted so that the concentration of the hydrogen gas in the gas phase region is less than 4% by volume.

In the second aspect, the electrolytic solution may be an alkaline aqueous solution.

In the second aspect, the electrolytic apparatus may further include: a cathode side circulation line which discharges the electrolytic solution from the cathode chamber and returns the electrolytic solution to the cathode chamber; and a circulation tank that is disposed in the middle of the anode side supplying line the cathode side supplying line, and the method may further include: discharging the electrolytic solution and the hydrogen gas from the cathode chamber, separating the hydrogen gas from the electrolytic solution, and returning the electrolytic solution containing dissolved hydrogen gas, from which the hydrogen gas has been separated, to the cathode chamber; and mixing the electrolytic solution from which the anode gas has been separated and the electrolytic solution from which the hydrogen gas has been separated in a circulation tank disposed in the middle of the anode side circulation line and the cathode side circulation line, wherein the gas phase region is formed in the circulation tank.

In this case, the anode gas is preferably fed directly to the gas phase region formed in the circulation tank.

In the second aspect, in water electrolysis, the anode gas is oxygen gas.

In the second aspect, the electrolytic solution may be pure water or non-purified water.

In the second aspect, the electrolytic solution on the anode side may be a chloride aqueous solution, and the electrolytic solution on the cathode side may be an alkaline solution.

Advantageous Effects of Invention

According to the present invention, a risk of hydrogen explosion can be surely prevented by a simple method of using anode gas generated in an electrolytic process, such as oxygen gas as a gas for dilution. That is, in the present invention, an operation can be realized with a safer process without causing any trouble to the electrolysis process by introducing the whole amount or a part of anode gas generated in an anode to a part where hydrogen gas exists as a gas phase in a closed process system, diluting a hydrogen concentration in the gas phase, and maintaining the concentration within a surely safe concentration region all the time. According to the present invention, it is not necessary to additionally use the air, inert gas, or the like for diluting hydrogen gas in the gas phase region. Therefore, it is possible to reduce operation cost. In addition, an attachment apparatus for supplying the air or inert gas is not necessary. Therefore, it is possible to reduce equipment cost largely.

The present invention is particularly effective in the process of alkaline water electrolysis. In alkaline water electrolysis, hydrogen gas exists as a gas phase in an upper part of a circulation tank in which anode liquid and cathode liquid are mixed, or the like. Therefore, the hydrogen gas in the gas phase region can be diluted by a simple means of supplying the whole amount or a part of anode gas (oxygen gas) to the circulation tank. As a result, the alkaline water electrolytic process can be operated safely without providing special equipment for diluting hydrogen gas concentration.

BRIEF DESCRIPTION OF DRAWINGS

FIG. 1 is a flow diagram illustrating an electrolytic apparatus according to a first embodiment of the present invention.

FIG. 2 is a flow diagram illustrating another example of the electrolytic apparatus according to the first embodiment of the present invention.

FIG. 3 is a flow diagram illustrating an electrolytic apparatus according to a second embodiment of the present invention.

FIG. 4 is a flow diagram illustrating another example of the electrolytic apparatus according to the second embodiment of the present invention.

FIG. 5 is a flow diagram illustrating an electrolytic apparatus according to a third embodiment of the present invention.

DESCRIPTION OF EMBODIMENTS

<First Embodiment>

FIG. 1 is a flow diagram illustrating an example of an electrolytic apparatus according to a first embodiment of the present invention.

In an electrolytic apparatus (alkaline water electrolytic apparatus) 1 in FIG. 1, a reference sign 2 indicates an anode chamber, a reference sign 3 indicates a cathode chamber, a reference sign 4 indicates a diaphragm, and a reference sign 5 indicates an electrolytic bath (alkaline water electrolytic bath). The anode chamber 2 houses an anode and generates anode gas. The cathode chamber 3 houses a cathode and generates hydrogen gas. The diaphragm 4 separates the anode chamber 2 and the cathode chamber 3 from each other. The electrolytic bath 5 includes the anode chamber 2, the cathode chamber 3, and the diaphragm 4. The anode chamber 2 and the cathode chamber 3 house electrolytic solutions. In the alkaline water electrolytic apparatus, the electrolytic solution is an alkaline aqueous solution (for example, an aqueous solution of an alkali metal hydroxide, specifically a KOH aqueous solution or a NaOH aqueous solution). The anode gas is oxygen gas. In the alkaline water electrolytic apparatus, the diaphragm is a cation exchange membrane, an anion exchange membrane, a composite membrane including a polymer porous layer and nonwoven fabric, or the like.

The electrolytic apparatus 1 includes an anode side circulation line and a cathode side circulation line. The anode side circulation line discharges an electrolytic solution from the anode chamber 2 and returns the electrolytic solution to the anode chamber 2. The cathode side circulation line discharges an electrolytic solution from the cathode chamber 3 and returns the electrolytic solution to the cathode chamber 3.

The anode side circulation line includes an anode side gas-liquid separation unit 6, an anode side discharge line 7, and an anode side supplying line 8. The anode side discharge line 7 is a channel connecting the anode chamber 2 of the electrolytic bath 5 to the anode side gas-liquid separation unit 6. The anode side discharge line 7 supplies an electrolytic solution and anode gas generated in the anode chamber 2 from the anode chamber 2 to the anode side gas-liquid separation unit 6. The anode side gas-liquid separation unit 6 is specifically a gas-liquid separation apparatus, a T shaped pipe, or the like. The anode side supplying line 8 is a channel connecting the anode chamber 2 to the anode side gas-liquid separation unit 6. A circulation pump 13 is disposed in the anode side supplying line 8.

The cathode side circulation line includes a cathode side gas-liquid separation unit 9, a cathode side discharge line 10, and a cathode side supplying line 11. The cathode side discharge line 10 is a channel connecting the cathode chamber 3 of the electrolytic bath 5 to the cathode side gas-liquid separation unit 9. The cathode side gas-liquid separation unit 9 is specifically a gas-liquid separation apparatus, a T shaped pipe, or the like. The cathode side supplying line 11 is a channel connecting the cathode chamber 3 to the cathode side gas-liquid separation unit 9. A circulation pump 14 is disposed in the cathode side supplying line 11.

The cathode side gas-liquid separation unit 9 is connected to a water sealing apparatus 16 through a pipe 15. The water sealing apparatus 16 houses water. An end of the pipe 15 is soaked in water in the water sealing apparatus 16.

In the electrolytic apparatus 1, a circulation tank 12 which is a closed container is disposed in the middle of the anode side supplying line 8 and the cathode side supplying line 11. The circulation tank 12 is common to the anode side supplying line 8 and the cathode side supplying line 11. An electrolytic solution is stored in the circulation tank 12. A gas phase region 21 is above the electrolytic solution (in an upper part of the circulation tank 12). A gas discharge pipe 22 is disposed in a top part of the circulation tank 12. The gas phase region can be formed also in a closed space in an upper part of a protrusion shaped pipe such as an inverse-U shaped pipe.

FIG. 1 illustrates an example in which a system of a line directed to the anode chamber 2 from the circulation tank 12 is different from a system of a line directed to the cathode chamber 3 from the circulation tank 12, and the circulation pump 13 or 14 is disposed in each of the systems. However, the present embodiment is not limited thereto. For example, one circulation pump can be used. In this case, the anode side supplying line and the cathode side supplying line connected to the circulation pump are made to be one common line. The common line branches to the line directed to the anode chamber and the line directed to the cathode chamber on a downstream side of the circulation pump.

A water supplying tank 18 is connected to the circulation tank 12 through a pipe 17. The water supplying tank 18 houses water. A pump 19 is disposed in the pipe 17.

In the electrolytic apparatus 1, an anode gas feeding line 20 is disposed between the anode side gas-liquid separation unit 6 and the circulation tank 12. In FIG. 1, the anode gas feeding line 20 is connected at an upper part than the liquid surface of the electrolytic solution housed in the circulation tank 12. However, the present embodiment is not limited thereto, and the anode gas feeding line 20 may be connected at a lower part than the liquid surface of the electrolytic solution in the circulation tank 12.

FIG. 2 is a flow diagram illustrating another example of the electrolytic apparatus according to the first embodiment. In FIG. 2, the gas discharge pipe 22 is connected to a water sealing apparatus 23. The water sealing apparatus 23 houses water. An end of the gas discharge pipe 22 is soaked in water in the water sealing apparatus 23.

A method for performing an alkaline water electrolysis using the electrolytic apparatuses 1 and 1' according to the first embodiment will be described below.

In the anode chamber 2, anode gas (oxygen gas) is generated by electrolysis. An electrolytic solution in the anode chamber 2 is discharged together with the generated oxygen gas from the anode chamber 2 through the anode side discharge line 7, and is conveyed to the anode side gas-liquid separation unit 6.

The anode side gas-liquid separation unit 6 separates the electrolytic solution and the anode gas conveyed from the anode chamber 2 from each other. The separated anode gas is discharged from the anode side gas-liquid separation unit 6 through the anode gas feeding line 20. On the other hand, the separated electrolytic solution is discharged from the anode side gas-liquid separation unit 6 through the anode side supplying line 8. The electrolytic solution is conveyed to the circulation tank 12 through the anode side supplying line 8.

In the cathode chamber 3, hydrogen gas is generated by electrolysis. An electrolytic solution in the cathode chamber 3 is discharged together with the generated hydrogen gas from the cathode chamber 3 through the cathode side discharge line 10, and is conveyed to the cathode side gas-liquid separation unit 9.

The cathode side gas-liquid separation unit 9 separates the electrolytic solution and the hydrogen gas conveyed from the cathode chamber 3 from each other. The separated hydrogen gas is conveyed from the cathode side gas-liquid separation unit 9 to the water sealing apparatus 16 through the pipe 15, passes through the water sealing apparatus 16, and then is discharged from the electrolytic apparatus 1. The discharged hydrogen gas is discarded or collected as valuables.

On the other hand, the separated electrolytic solution is discharged from the cathode side gas-liquid separation unit 9 through the cathode side supplying line 11. The electrolytic solution is conveyed to the circulation tank 12 through the anode side supplying line 11.

The electrolytic solution on the anode side and the electrolytic solution on the cathode side, conveyed to the circulation tank 12, are mixed and stored in the circulation tank 12. The electrolytic solution in the circulation tank 12 is circulated into the anode chamber 2 through the anode side supplying line 8 by starting of the circulation pump 13. The electrolytic solution in the circulation tank 12 is circulated into the cathode chamber 3 through the cathode side supplying line 11 by starting of the circulation pump 14. The electrolysis is performed continuously in the state that concentrations of the electrolytic solutions circulated and supplied into the anode chamber 2 and the cathode chamber 3 are assumed to be substantially uniform by mixing the electrolytic solutions in the circulation tank 12.

The concentration of the electrolytic solution (concentration of electrolyte) in the circulation tank 12 is maintained constant all the time. Specifically, when the concentration of the electrolytic solution in the circulation tank 12 is lowered, the pump 19 starts, and water in the water supplying tank 18 is supplied to the circulation tank 12 through the pipe 17.

Here, oxygen gas is dissolved in the electrolytic solution from which oxygen gas has been separated by the anode side gas-liquid separation unit 6. Hydrogen gas is dissolved in the electrolytic solution from which hydrogen gas has been separated by the cathode side gas-liquid separation unit 9. Therefore, the electrolytic solution conveyed to the circulation tank 12 contains dissolved oxygen gas and dissolved hydrogen gas. When the amount of the dissolved gas exceeds a saturation dissolution amount due to a process operation condition, the dissolved oxygen gas and the dissolved hydrogen gas become gas on the anode side supplying line 8 and the cathode side supplying line 11. This gas (oxygen gas and hydrogen gas) is accumulated in the gas phase region 21 in an upper part of the circulation tank 12.

The anode gas feeding line 20 conveys the whole amount of the oxygen gas separated in the anode side gas-liquid separation unit 6 to the circulation tank 12. The conveyed oxygen gas is conveyed to the gas phase region 21, is mixed with the oxygen gas and the hydrogen gas generated from the electrolytic solution, and is accumulated in the gas phase region 21.

The oxygen gas and the hydrogen gas accumulated in the gas phase region 21 are discharged from the circulation tank 12 through the gas discharge pipe 22. In the electrolytic apparatus 1 of FIG. 1, the discharged oxygen gas and hydrogen gas is released outside the system. In the electrolytic apparatus 1' of FIG. 2, the discharged oxygen gas and hydrogen gas is conveyed to the water sealing apparatus 23. The water sealing apparatus 23 removes moisture from the oxygen gas and the hydrogen gas, and then discharges the oxygen gas and the hydrogen gas outside the system of the electrolytic apparatus 1'.

The amount of the oxygen gas and the hydrogen gas released from the electrolytic solution into the gas phase region 21 is very small. Basically, it cannot be considered that the concentration of hydrogen gas in the gas phase region becomes such a high concentration as to exceed the lower limit value of explosion limit. The present invention has been achieved in order to enhance safety while a small but possible risk caused in a case of continuous electrolysis or the like is worried. As described above, the amount of the hydrogen gas released into the gas phase region 21 is very small. Meanwhile, the amount of the oxygen gas fed from the anode gas feeding line 20 to the gas phase region 21 is large. Therefore, a risk of hydrogen explosion is prevented by diluting the hydrogen gas in the gas phase region 21 such that the concentration of hydrogen gas is surely less than the lower limit value of explosion limit. In a mixture system of oxygen gas and hydrogen gas, the lower limit value of explosion limit is 4% by volume. Therefore, in the electrolytic apparatus 1 (1') of the present embodiment, the concentration of hydrogen gas in the gas phase region 21 is less than 4% by volume.

In the electrolytic apparatuses (alkaline water electrolytic apparatuses) 1 and 1' and the electrolytic method of the first embodiment, the hydrogen gas in the gas phase region is much more diluted than the lower limit value of explosion limit (specifically 4% by volume). Therefore, a risk of hydrogen explosion can be surely prevented, and an electrolysis treatment can be performed continuously and more safely.

In the electrolytic apparatus of the present embodiment, hydrogen gas is diluted by feeding the anode gas (oxygen gas) generated in the apparatus to the gas phase region in which the hydrogen gas is accumulated. Therefore, an equipment for supplying the air or inert gas to the circulation tank is not necessary. Therefore, it is possible to reduce equipment cost and operation cost.

<Second Embodiment>

FIG. 3 is a flow diagram illustrating an example of an electrolytic apparatus according to a second embodiment of the present invention.

In an electrolytic apparatus (alkaline water electrolytic apparatus) 101 of FIG. 3, the same reference signs as in FIG. 1 are given to the same components as in FIG. 1.

In the electrolytic apparatus 101, an anode gas release line 102 is connected to the middle part of an anode gas feeding line 20. A flow rate regulating unit is disposed at the branch of the anode gas feeding line 20 and the anode gas release line 102. For example, as the flow rate regulating unit, a flow rate regulating valve (not illustrated) is disposed in the anode gas release line 102.

FIG. 4 is a flow diagram illustrating another example of the electrolytic apparatus according to the second embodiment. In an electrolytic apparatus 101' of FIG. 4, a gas discharge pipe 22 is connected to a water sealing apparatus 23. The water sealing apparatus 23 houses water. An end of the gas discharge pipe 22 is soaked in water in the water sealing apparatus 23.

The anode gas release line 102 is connected to the water sealing apparatus 23. An end of the anode gas release line 102 is soaked in water in the water sealing apparatus 23.

A method for performing alkaline water electrolysis using the electrolytic apparatuses 101 and 101' according to the second embodiment will be described below. The second embodiment is different from the first embodiment in a conveying process of anode gas to a circulation tank 12.

Anode gas (oxygen gas) discharged from the anode side gas-liquid separation unit 6 and flowing in the anode gas feeding line 20 is divided into the anode gas feeding line 20 and the anode gas release line 102 at the above-described branch. A part of the oxygen gas is supplied to the circulation tank 12 through the anode gas feeding line 20. The oxygen gas is mixed with oxygen gas and hydrogen gas generated from an electrolytic solution in the circulation tank 12. The concentration of hydrogen gas in a gas phase region 21 can be thereby more surely maintained less than the lower limit value of explosion limit (specifically less than 4% by volume). The amount of the anode gas supplied from the anode gas feeding line 20 to the circulation tank 12 is appropriately controlled in accordance with the concentration of hydrogen gas in the gas phase region 21.

In the electrolytic apparatus 101 of FIG. 3, remaining oxygen gas is released outside the system through the anode gas release line 102. In the electrolytic apparatus 101' of FIG. 4, remaining oxygen gas is conveyed to the water sealing apparatus 23 through the anode gas release line 102, and moisture is removed. Thereafter, the oxygen gas from the anode gas release line 102 is discharged outside the system together with the oxygen gas and the hydrogen gas discharged from the circulation tank 12.

Also in the electrolytic apparatuses (alkaline water electrolytic apparatuses) 101 and 101' and the electrolytic method of the second embodiment, the hydrogen gas in the gas phase region is much more diluted than the lower limit value of explosion limit (specifically 4% by volume). Therefore, a risk of hydrogen explosion can be surely prevented, and an electrolysis treatment can be performed continuously and more safely. In addition, the anode gas (oxygen gas) generated in the apparatus is used for diluting the hydrogen gas in the gas phase region. Therefore, it is possible to reduce equipment cost and operation cost.

In the first and second embodiments, the electrolytic apparatuses and the electrolytic methods in which the electrolytic solutions on the anode side and on the cathode side are mixed in the circulation tank, and then are circulated into the anode chamber and the cathode chamber, have been described. However, the present invention is not limited thereto. For example, the present invention is applicable to an electrolytic apparatus and an electrolytic method in which the electrolytic solutions are mixed in the anode side supplying line and the cathode side supplying line without providing the circulation tank. The present invention is also applicable to an electrolytic apparatus and an electrolytic method in which hydrogen can move to the anode side through the diaphragm, and the anode side supplying line and the cathode side supplying line each individually circulate the electrolytic solution.

<Third Embodiment>

As a third embodiment, an electrolytic apparatus electrolyzing a chloride aqueous solution and an electrolytic method using the same will be described. FIG. 5 is a flow diagram illustrating an example of the electrolytic apparatus according to the third embodiment.

In an electrolytic apparatus 201 in FIG. 5, a reference sign 202 indicates an anode chamber, a reference sign 203 indicates a cathode chamber, a reference sign 204 indicates a diaphragm, and a reference sign 205 indicates an electrolytic bath. The anode chamber 202 houses an anode and generates anode gas. The cathode chamber 203 houses a cathode and generates hydrogen gas. The diaphragm 204 separates the anode chamber 202 and the cathode chamber 203 from each other. The electrolytic bath 205 includes the anode chamber 202, the cathode chamber 203, and the diaphragm 204. The anode chamber 202 and the cathode chamber 203 house electrolytic solutions. The electrolytic solution on the anode side is a chloride aqueous solution such as a NaCl aqueous solution or a KCl aqueous solution. The electrolytic solution on the cathode side is an alkaline aqueous solution such as a NaOH aqueous solution or a KOH aqueous solution. For example, in an apparatus for brine electrolysis, the electrolytic solution on the anode side is a NaCl aqueous solution, and the electrolytic solution on the cathode side is a NaOH aqueous solution.

The anode gas is chlorine gas. In a saline electrolytic apparatus, the diaphragm 204 is an ion exchange membrane (cation exchange membrane).

The electrolytic apparatus 201 includes an anode side circulation line and a cathode side circulation line. The anode side circulation line discharges an electrolytic solution from the anode chamber 202 and returns the electrolytic solution to the anode chamber 202. The cathode side circulation line discharges an electrolytic solution from the cathode chamber 203 and returns the electrolytic solution to the cathode chamber 203.

The anode side circulation line includes an anode side gas-liquid separation unit 206, an anode side discharge line 207, and an anode side supplying line 208. The anode side discharge line 207 is a channel connecting the anode chamber 202 of the electrolytic bath 205 to the anode side gas-liquid separation unit 206. The anode side discharge line 207 supplies the electrolytic solution and the anode gas generated in the anode chamber 202 from the anode chamber 202 to the anode side gas-liquid separation unit 206. The anode side gas-liquid separation unit 206 is specifically a gas-liquid separation apparatus, a T shaped pipe, or the like. The anode side supplying line 208 is a channel connecting the anode chamber 202 to the anode side gas-liquid separation unit 206. A circulation tank 212a and a circulation pump 213 are disposed in the anode side supplying line 208.

In the electrolytic apparatus 201, an anode gas feeding line 220 is connected to an upper part of the anode side gas-liquid separation unit 206. The anode gas feeding line 220 is connected to the circulation pump 213. A first anode gas release line 215 is connected to the middle part of the anode gas feeding line 220. A flow rate regulating unit is disposed at the branch of the anode gas feeding line 220 and the first anode gas release line 215. For example, as the flow rate regulating unit, a flow rate regulating valve (not illustrated) is disposed in the first anode gas release line 215.

A second anode gas release line 216 connecting the circulation pump 213 to the first anode gas release line 215 is disposed.

A third anode gas release line 217 is connected to an upper part of the circulation tank 212a. In FIG. 5, the third anode gas release line 217 is connected to the anode gas feeding line 220. However, the third anode gas release line 217 may be connected to the first anode gas release line 215.

The cathode side circulation line includes a cathode side gas-liquid separation unit 209, a cathode side discharge line 210, and a cathode side supplying line 211. The cathode side discharge line 210 is a channel connecting the cathode chamber 203 of the electrolytic bath 205 to the cathode side gas-liquid separation unit 209. The cathode side gas-liquid separation unit 209 is specifically a gas-liquid separation apparatus, a T shaped pipe, or the like. The cathode side supplying line 211 is a channel connecting the cathode chamber 203 to the cathode side gas-liquid separation unit 209. A circulation tank 212b and a circulation pump 214 are disposed in the cathode side supplying line 211.

A cathode gas release line 218 is connected to an upper part of the cathode side gas-liquid separation unit 209.

A method for performing electrolysis using the electrolytic apparatuses 201 according to the third embodiment will be described below by exemplifying brine electrolysis.

In the anode chamber 202, anode gas (chlorine gas) and $Na^+$ are generated by an electrolysis of an electrolytic solution (NaCl aqueous solution). $Na^+$ passes through the diaphragm (ion exchange membrane) 204 and moves into the cathode chamber 203.

In the cathode chamber 203, hydrogen gas and $OH^-$ are generated by electrolysis of an electrolytic solution (NaOH aqueous solution). The $OH^-$ and the $Na^+$ which has moved from the anode chamber 202 are reacted with each other to generate caustic soda (NaOH) in the cathode chamber 203.

Apart of the hydrogen gas generated by the electrolysis in the cathode chamber 203 passes through the diaphragm (ion exchange membrane) 204 and moves into the anode chamber 202. The amount of this hydrogen gas is very small. Therefore, the hydrogen gas is dissolved in the electrolytic solution on the anode side.

An electrolytic solution in the cathode chamber 203 is discharged together with the hydrogen gas from the cathode chamber 203 through the cathode side discharge line 210, and is conveyed to the cathode side gas-liquid separation unit 209.

The cathode side gas-liquid separation unit 209 separates the electrolytic solution and the hydrogen gas conveyed from the cathode chamber 203 from each other. The separated hydrogen gas is discharged outside the electrolytic apparatus 201 through the cathode gas release line 218.

The separated electrolytic solution is discharged from the cathode side gas-liquid separation unit 209 through the cathode side supplying line 211, and is conveyed to the circulation tank 212b.

The circulation tank 212b stores the electrolytic solution conveyed from the cathode side gas-liquid separation unit 209. The electrolytic solution is discharged from the circulation tank 212b by starting of the circulation pump 214, and is supplied to the cathode chamber 203 through the cathode side supplying line 211. A part of the electrolytic solution is discharged outside the system of the electrolytic apparatus 201 through a pipe branching from the cathode side supplying line 211. Caustic soda is collected from this discharged electrolytic solution.

An electrolytic solution in the anode chamber 202 is discharged together with the chlorine gas from the anode chamber 202 through the anode side discharge line 207, and is conveyed to the anode side gas-liquid separation unit 206.

The anode side gas-liquid separation unit 206 separates the electrolytic solution and the chlorine gas conveyed from the anode chamber 202 from each other. The separated anode gas is discharged from the anode side gas-liquid separation unit 206 through the anode gas feeding line 220.

The separated electrolytic solution is discharged from the anode side gas-liquid separation unit 206 through the anode side supplying line 208, and is conveyed to the circulation tank 212a.

The circulation tank 212a stores the electrolytic solution conveyed from the anode side gas-liquid separation unit 206. The electrolytic solution in the circulation tank 212a contains dissolved chlorine gas. The chlorine gas is released from the electrolytic solution by adjusting the pH of the electrolytic solution in the circulation tank 212a. The released chlorine gas is discharged from an upper part of the circulation tank 212a. In FIG. 5, the chlorine gas is conveyed to the anode gas feeding line 220 through the third anode gas release line 217.

The electrolytic solution is discharged from the circulation tank 212a by starting of the circulation pump 213, and is supplied to the anode chamber 202 through the anode side supplying line 208.

Electrolysis is performed continuously by the above processes. By the continuous electrolysis, the dissolved hydrogen gas remains in the electrolytic solution on the anode side and the concentration thereof increases. When the amount of the dissolved hydrogen gas exceeds a saturation dissolution amount, the dissolved hydrogen gas becomes gas in the anode side circulation line, and the hydrogen gas is released. For example, when hydrogen gas is generated between the anode side gas-liquid separation unit 206 and the circulation pump 213, the hydrogen gas is accumulated in the circulation pump 213. That is, a gas phase region is formed in the circulation pump 213.

In the third embodiment, the anode gas feeding line 220 conveys the whole amount or a part of the chlorine gas separated in the anode side gas-liquid separation unit 206 to the circulation pump 213. When the flow rate regulating valve of the first anode gas release line 215 is closed, the whole amount of the chlorine gas is conveyed to the circulation pump 213. When the flow rate regulating valve is released, a part of the chlorine gas is conveyed to the circulation pump 213. Chlorine gas passing through the first anode gas release line 215 is discharged outside the electrolytic apparatus 201, and is collected as valuables.

The chlorine gas conveyed to the circulation pump 213 through the anode gas feeding line 220 is mixed with hydrogen gas in the gas phase region in the circulation pump 213. Thereafter, the chlorine gas is discharged together with a very small amount of hydrogen gas from the circulation pump 213, and is released outside the system of the electrolytic apparatus 201 through the second anode gas release line 216 and the first anode gas release line 215.

The amount of hydrogen gas released from the electrolytic solution is very small. On the other hand, the amount of chlorine gas fed from the anode gas feeding line 220 is larger than that of the released hydrogen gas. Therefore, the hydrogen gas is diluted in the gas phase region. The concentration of hydrogen gas is much less than the lower limit value of explosion limit. A risk of hydrogen explosion can be thereby more surely prevented. In the mixture system of chlorine gas and hydrogen gas, the lower limit value of explosion limit is 5.5% by volume. Therefore, in the present embodiment, theoretically, the concentration of hydrogen gas in the gas phase region is only required to be less than 5.5% by volume. However, in order to prevent the risk of hydrogen explosion more surely, also in this case, the concentration of hydrogen gas in the gas phase region is preferably less than 4% by volume as in the other embodiments.

Also in the above-described circulation tank 212a, the electrolytic solution is separated from the gas. Therefore, the circulation tank 212a also serves as a gas-liquid separation unit (anode side gas-liquid separation unit). From this fact, as an alternative structure of FIG. 5, an anode gas feeding line connecting the circulation pump 213 to the middle part of the third anode gas release line 217 may be provided.

Alternatively, an anode gas feeding line connecting the circulation pump 213 to an upper part of the circulation tank 212a may be provided without providing the third anode gas release line. In these alternative structures, the whole amount or a part of the chlorine gas separated from the electrolytic solution in the circulation tank 212a is fed to the gas phase region formed in the circulation pump 213.

As described above, a risk of hydrogen explosion can be surely prevented, and an electrolysis treatment can be performed continuously and more safely also by the electrolytic apparatus and the electrolytic method of the third embodiment.

In the electrolytic apparatus of the present embodiment, hydrogen gas is diluted by feeding chlorine gas generated in the apparatus to the gas phase region in which the hydrogen gas is accumulated. Therefore, it is not necessary to introduce impurities such as the air or inert gas into the system. Therefore, it is possible to collect high purity chlorine gas.

The technical idea of the present invention is applicable to other electrolysis generating hydrogen gas, such as electrolysis of pure water, electrolysis of non-purified water, electrolysis of a bromide aqueous solution, electrolysis of a hydrochloric acid aqueous solution, or electrolysis of a sulfuric acid aqueous solution, in addition to alkaline water electrolysis and electrolysis of a chloride aqueous solution. In each electrolysis, gas generated in the anode is used as the anode gas. Examples thereof include halogen gas such as bromine gas in addition to oxygen gas and chlorine gas.

EXAMPLES

Next, Examples of the present invention will be described. However, the present invention is not limited thereto.

Alkaline water electrolysis was performed using the apparatus illustrated in FIG. 1.

A reaction of water decomposition is $H_2O \rightarrow 1/2 O_2 + H_2$. In the alkaline water electrolytic process, the generation amount of oxygen is half of that of hydrogen.

[Electrolytic Conditions]

The generation amount of hydrogen gas was set to 100 $Nm^3/h$. Electrolysis was performed at the electrolytic temperature of 60° C., CD=5 $kA/m^2$.

As an electrolytic solution, 25% by mass KOH was used.

Regularly, the operation is performed at the charge density. However, the operation state changes appropriately such that the operation is stopped or performed at a high charge density of 6 $kA/m^2$. The gauge gas pressure and the generation amount of gas during the operation were set to the following values.

$H_2$ gas: +560 $mmH_2O$, 100 $Nm^3/h$
$O_2$ gas: +260 $mmH_2O$, 50 $Nm^3/h$

The operation was performed at an amount of circulation liquid on the cathode side of 12.5 $m^3/h$.

When the pressure of the gas phase part in the circulation tank 12 was assumed to be atmospheric pressure 0 $mmH_2O$, and the whole amount of dissolved hydrogen gas is released into the gas phase part, the concentration of hydrogen gas in the gas phase part in the circulation tank becomes maximum. However, of course, these numerical values are obtained by assuming that the generation amount of hydrogen is 100 $Nm^3/h$, and change according to the scale of the apparatus, operation conditions, or the like.

However, the explosion limit value of hydrogen or other gas does not change. Therefore, it is preferable to purge or replace hydrogen stored in a closed space adequately under consideration of safety.

[Concentration of Dissolved Hydrogen Gas in KOH]

A Bunsen absorption coefficient α of a KOH solution having a concentration of 5 $mol/dm^3$ at 30° C. is $0.37 \times 10^{-2}$ according to "Revised Third edition Chemistry Handbook Fundamental II" edited by the Chemical society of Japan. When a saturated concentration of dissolved hydrogen is calculated using this value, the saturated concentration of dissolved hydrogen (30° C.)=gas density $[g/cm^3] \times \alpha=0.33$ mg/L.

[Concentration of Dissolved Hydrogen at 60° C., 560 $mmH_2O$]

The concentration of the KOH solution 5 $mol/dm^3$ is about 23 wt %, slightly smaller than the saturated concentration of dissolved hydrogen of 25 wt % (0.33 mg/L). According to the above Chemistry Handbook II, the saturated concentration of hydrogen in water at 60° C. is 97.6% based on that at 30° C. When the saturated concentration of dissolved hydrogen in the KOH solution is decreased in accordance with the temperature similarly to the saturated concentration of dissolved hydrogen in water, the saturated concentration of dissolved hydrogen in the 25 wt % KOH solution at 60° C. can be considered to be 0.33 mg/L.

If the concentration of dissolved hydrogen follows Henry's law, the saturated concentration of dissolved hydrogen at the operation pressure is 0.33 $mg/L \times 97.6/100 \times (10332+560)/10332=0.34$ mg/L.

[Maximum Amount of Hydrogen Gas Diffused as Gas in Circulation Tank]

When hydrogen-saturated KOH is supplied to the circulation tank at 12.5 $m^3/h$, a maximum flow rate of hydrogen gas which can be released into the gas phase is 12.5 $m^3/h \times 0.34$ mg/L=4.25 g/h=47.6 NL/h=0.0476 $Nm^3/h$. (It was assumed that the hydrogen molecule was 2 g, and the standard condition was 22.4 L.)

[Amount of Dilution Gas for 4%-lower Limit Value of Explosion Limit (LEL) of Hydrogen]

The amount of dilution gas for the lower limit value of explosion limit of hydrogen is 47.6/0.04-47.6 NL/h=1.14 $Nm^3/h$. It is necessary to make the amount of dilution gas more than 1.14 $Nm^3/h$ in order to maintain the concentration of hydrogen the lower limit value of explosion limit of hydrogen or less. When hydrogen gas is diluted with oxygen gas generated in the anode, having a flow rate of 50 $Nm^3/h$, the concentration of hydrogen is 0.1%.

Hereinafter, the process of the generation amount of hydrogen of 100 $Nm^3/h$ will be described. Conditions thereof are as follows:

Electrolytic bath: reaction area 1.13 $m^2$, 44 elements, approximate inner volume of one element 40 to 50 L (anode chamber+cathode chamber)

Volume of the whole electrolytic bath: 1.8 $m^3$ to 2.2 $m^3$

Volume of circulation tank: about 1.1 $m^3$

In the circulation tank in the process, an upper part thereof becomes a gas phase zone. When liquid phase: gas phase=50:50 is assumed, about 500 L becomes a gas phase zone of the circulation tank, and hydrogen gas in the system is expelled by supplying gas for replacement to the upper part gas phase zone for securing safety.

Assuming that hydrogen gas of 47.6 NL/h may be generated in the circulation tank (gas phase 500 L), when the system is filled with hydrogen gas of 500 $L \times 0.04=20$ L or more, the explosion limit of 4% is reached, nevertheless it is not realistic. That is, the explosion limit is reached in $20 \times 60/47.6=25$ minutes.

Therefore, oxygen of 50 $Nm^3/h$ is generated in the electrolytic reaction, and if oxygen is supplied such that the concentration of hydrogen gas of 47.9 NL/h is less than 4% by volume, explosion does not occur.

The whole volume including hydrogen of 4% by volume is 47.6 NL/h/0.04=1190 NL/h. This amount includes the amount of hydrogen. Therefore, a necessary amount of oxygen is 1190 NL/h−47.6 NL/h=1142.4 NL/h=1.14 Nm$^3$/h.

That is, the concentration of hydrogen gas can be maintained less than 4% by volume in the system of the process by supplying oxygen of more than 1.14 Nm$^3$/h. Such a system is safe.

In the process of generating hydrogen of 1000 Nm$^3$/h and oxygen of 50 Nm$^3$/h as an example of this case, it has been found that a safe operation can be performed by supplying an amount equivalent to 2.2% (1.1 Nm$^3$/h) of the whole amount of oxygen generated in the anode to the gas phase part of the circulation tank.

Basically, the amount of hydrogen gas to be diluted from the dissolved hydrogen gas is such an amount as to be sufficiently diluted with self-generated oxygen regardless of the size of the electrolytic process. An electrolytic apparatus having any volume is also similar thereto.

REFERENCE SIGNS LIST 1, 1', 101, 101', 201: electrolytic apparatus
2, 202: anode chamber
3, 203: cathode chamber
4, 204: diaphragm
5, 205: electrolytic bath
6, 206: anode side gas-liquid separation unit
7, 207: anode side discharge line
8, 208: anode side supplying line
9, 209: cathode side gas-liquid separation unit
10, 210: cathode side discharge line
11, 211: cathode side supplying line
12, 212a, 212b: circulation tank
13, 14, 213, 214: circulation pump
15, 17: pipe
16, 23: water sealing apparatus
18: water supplying tank
19: pump
20, 220: anode gas feeding line
21: gas phase region
22: gas discharge pipe
102: anode gas release line
215: first anode gas release line
216: second anode gas release line
217: third anode gas release line
218: cathode gas release line

The invention claimed is:

1. An electrolytic apparatus comprising:
an anode chamber that houses an anode and generates anode gas;
a cathode chamber that houses a cathode and generates hydrogen gas;
a diaphragm that separates the anode chamber and the cathode chamber from each other, and
an anode side circulation line that discharges an electrolytic solution from the anode chamber and returns the electrolytic solution to the anode chamber,
wherein the anode side circulation line comprises:
an anode side discharge line that discharges the electrolytic solution and the anode gas from the anode chamber;
an anode side gas-liquid separation unit that separates the anode gas from the electrolytic solution discharged from the anode side discharge line; and
an anode side supplying line that discharges the electrolytic solution from the anode side gas-liquid separation unit, and returns the electrolytic solution to the anode chamber,
the electrolytic apparatus further comprises a circulation tank that stores the electrolytic solution, and a circulation pump that circulates the electrolytic solution in the circulation tank, both of which are disposed in a middle of the anode side supplying line,
the electrolytic apparatus further comprises an anode gas feeding line that connects the anode side gas-liquid separation unit to a gas phase region formed in an upper part in the circulation tank,
wherein the anode gas is mixed in the circulation tank, with hydrogen gas derived from dissolved hydrogen gas and existing as a gas phase,
the anode gas feeding line feeds at least part of the anode gas separated by the anode side gas-liquid separation unit to the gas phase region, and
the concentration of the hydrogen gas in the gas phase region is less than a lower limit value of explosion limit.

2. The electrolytic apparatus according to claim 1, wherein the anode gas is oxygen gas.

3. The electrolytic apparatus according to claim 1, wherein the electrolytic solution is an alkaline aqueous solution.

4. The electrolytic apparatus according to claim 1, wherein the electrolytic solution is pure water or non-purified water.

5. The electrolytic apparatus according to claim 1, wherein the electrolytic solution on the anode side is a chloride aqueous solution, and the electrolytic solution on the cathode side is an alkaline aqueous solution.

6. The electrolytic apparatus according to claim 1, further comprising:
a cathode side circulation line comprising:
a cathode side discharge line that discharges the electrolytic solution and the hydrogen gas from the cathode chamber,
a cathode side gas-liquid separation unit that separates the hydrogen gas from the electrolytic solution discharged from the cathode side discharge line; and
a cathode side supplying line that discharges the electrolytic solution separated by the cathode side gas-liquid separation unit from the cathode side gas-liquid separation unit, and feeds the electrolytic solution to the cathode chamber,
wherein the circulation tank is disposed in the middle of the anode side supplying line and is connected to the cathode side supplying line, and in the circulation tank the electrolytic solution fed from the anode side supplying line is mixed with the electrolytic solution fed from the cathode side supplying line.

7. The electrolytic apparatus according to claim 6, wherein the anode gas feeding line is connected to the gas phase region formed in an upper part in the circulation tank.

8. The electrolytic apparatus according to claim 1, wherein the concentration of the hydrogen gas in the gas phase region is less than 4% by volume.

9. An electrolytic method of electrolyzing an electrolytic solution using an electrolytic apparatus, wherein the electrolytic apparatus comprises:
an anode chamber that houses an anode and generates anode gas;
a cathode chamber that houses a cathode and generates hydrogen gas;

a diaphragm that separates the anode chamber and the cathode chamber from each other, and an anode side circulation line that discharges the electrolytic solution from the anode chamber and returns the electrolytic solution to the anode chamber, the method comprising:

discharging the electrolytic solution and the anode gas from the anode chamber;

separating the anode gas from the electrolytic solution;

returning the electrolytic solution from which the anode gas has been separated to the anode chamber, feeding at least part of the separated anode gas to a gas phase region in which the anode gas is mixed with hydrogen gas derived from dissolved hydrogen gas and existing as a gas phase; and diluting the hydrogen gas in the gas phase region with the fed anode gas so that concentration of the hydrogen gas in the gas phase region is less than a lower limit value of explosion limit.

10. The electrolytic method according to claim 9, wherein the anode gas is oxygen gas.

11. The electrolytic method according to claim 9, wherein the electrolytic solution is an alkaline aqueous solution.

12. The electrolytic method according to claim 9, wherein the electrolytic solution is pure water or non-purified water.

13. The electrolytic method according to claim 9, wherein the electrolytic solution on the anode side is a chloride aqueous solution, and the electrolytic solution on the cathode side is an alkaline solution.

14. The electrolytic method according to claim 9, wherein the electrolytic apparatus further comprises:

a cathode side circulation line that discharges the electrolytic solution from the cathode chamber and returns the electrolytic solution to the cathode chamber, a circulation tank that is disposed in a middle of the anode side circulation line and the cathode side circulation line; and a circulation pump that circulates the electrolytic solution in the circulation tank, and the method further comprises:

discharging the electrolytic solution and the hydrogen gas from the cathode chamber;

separating the hydrogen gas from the electrolytic solution;

returning the electrolytic solution containing dissolved hydrogen gas, from which the hydrogen has been separated, to the cathode chamber; and mixing in a circulation tank, the electrolytic solution from which the anode gas has been separated and the electrolytic solution from which the hydrogen gas has been separated, and the gas phase region is formed in an upper part in the circulation tank.

15. The electrolytic method according to claim 14, wherein the separated anode gas is directly fed to the gas phase region formed in the circulation tank.

16. The electrolytic method according to claim 9, wherein, in the dilution step, the hydrogen gas in the gas phase region is diluted so that the concentration of the hydrogen gas in the gas phase region is less than 4% by volume.

* * * * *